(12) United States Patent
Ni (10) Patent No.: US 10,707,572 B2
(45) Date of Patent: Jul. 7, 2020

(54) ANTENNA AND UNMANNED AERIAL VEHICLE

(71) Applicant: AUTEL ROBOTICS CO., LTD., Shenzhen, Guangdong (CN)

(72) Inventor: Feng Ni, Guangdong (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 25 days.

(21) Appl. No.: 15/989,907

(22) Filed: May 25, 2018

(65) Prior Publication Data

US 2019/0013578 A1 Jan. 10, 2019

Related U.S. Application Data

(63) Continuation of application No. PCT/CN2018/083169, filed on Apr. 16, 2018.

(30) Foreign Application Priority Data

Jul. 10, 2017 (CN) .................... 2017 2 0830737 U (51) Int. Cl.
*H01Q 3/02* (2006.01)
*H01Q 1/28* (2006.01)
(Continued)

(52) U.S. Cl.
CPC ............ *H01Q 3/02* (2013.01); *H01Q 1/28* (2013.01); *H01Q 1/282* (2013.01); *H01Q 3/06* (2013.01);
(Continued)

(58) Field of Classification Search
CPC . H01Q 3/02; H01Q 1/28; B64C 27/08; B64C 39/024; B64C 2201/127
See application file for complete search history.

(56) References Cited

U.S. PATENT DOCUMENTS 4,163,535 A * 8/1979 Austin .................. B64C 39/024
244/17.11
5,552,983 A * 9/1996 Thornberg ........... G05D 1/0033
180/167
(Continued)

FOREIGN PATENT DOCUMENTS

CN 103076614 A 5/2013
CN 204916163 U 12/2015
(Continued)

OTHER PUBLICATIONS

International Search Report dated Jun. 25, 2018; PCT/CN2018/083169.
(Continued)

*Primary Examiner* — Hai V Tran
*Assistant Examiner* — Bamidele A Jegede (57) ABSTRACT

The present invention discloses an antenna and an unmanned aerial vehicle, where the antenna is applied to the unmanned aerial vehicle and the unmanned aerial vehicle includes a camera apparatus, the antenna including an antenna body and a bending part connected to the antenna body; and the bending part bends to a direction avoiding a field of view of the camera apparatus. Based on the foregoing technical solutions, in the embodiments of the present invention, it can be ensured that the antenna has a certain effective length to obtain a relatively strong radio signal, and avoids a shooting vision of the camera apparatus at the same time, so that images satisfying user demands are obtained.

16 Claims, 4 Drawing Sheets

(51) Int. Cl.
*H01Q 3/06* (2006.01)
*B64C 39/02* (2006.01)
*B64C 27/08* (2006.01)
*H01Q 21/28* (2006.01)

(52) U.S. Cl.
CPC ............ *B64C 27/08* (2013.01); *B64C 39/024* (2013.01); *B64C 2201/127* (2013.01); *H01Q 21/28* (2013.01)

(56) References Cited

U.S. PATENT DOCUMENTS

| | | | | |
|---|---|---|---|---|
| 8,544,788 | B1* | 10/2013 | Capper | B64B 1/28 244/30 |
| 8,903,568 | B1* | 12/2014 | Wang | G05D 1/0016 701/2 |
| 9,242,714 | B2* | 1/2016 | Wang | B64C 39/028 |
| 9,522,732 | B1* | 12/2016 | Froloff | B64C 39/024 |
| 9,533,760 | B1* | 1/2017 | Wagreich | H04N 7/185 |
| 9,616,998 | B2* | 4/2017 | Oakley | B64C 27/08 |
| 2009/0132100 | A1* | 5/2009 | Shibata | A01M 7/0089 701/2 |
| 2010/0228406 | A1* | 9/2010 | Hamke | G05D 1/0038 701/3 |
| 2012/0083945 | A1* | 4/2012 | Oakley | B64C 27/08 701/2 |
| 2013/0200207 | A1* | 8/2013 | Pongratz | B64C 39/024 244/2 |
| 2014/0117149 | A1* | 5/2014 | Zhou | A63H 27/12 244/17.23 |
| 2015/0035437 | A1* | 2/2015 | Panopoulos | F21V 14/02 315/112 |
| 2015/0212391 | A1* | 7/2015 | Waibel | G03B 15/006 701/2 |
| 2015/0230150 | A1* | 8/2015 | Wang | H04B 7/18506 370/252 |
| 2015/0254988 | A1* | 9/2015 | Wang | G05D 1/0214 701/3 |
| 2015/0370250 | A1* | 12/2015 | Bachrach | G05D 1/0016 701/2 |
| 2016/0114887 | A1* | 4/2016 | Zhou | B60F 5/02 348/148 |
| 2016/0229556 | A1* | 8/2016 | Zhou | B64D 47/08 |
| 2016/0286128 | A1* | 9/2016 | Zhou | H04N 7/00 |
| 2016/0327956 | A1* | 11/2016 | Zhang | B64C 39/024 |
| 2016/0340028 | A1* | 11/2016 | Datta | B64C 39/024 |
| 2016/0376000 | A1* | 12/2016 | Kohstall | B64C 37/00 114/313 |
| 2017/0073070 | A1* | 3/2017 | Xing | B64C 39/024 |
| 2017/0113789 | A1* | 4/2017 | Ou | H02G 3/04 |
| 2017/0174362 | A1* | 6/2017 | Zhao | F16M 11/041 |
| 2019/0016475 | A1* | 1/2019 | Zhong | G01C 23/00 |

FOREIGN PATENT DOCUMENTS

| | | | | |
|---|---|---|---|---|
| CN | 105235898 | A | | 1/2016 |
| CN | 105292471 | A | | 2/2016 |
| CN | 105235898 | B | * 6/2016 | ............ B64C 27/08 |
| CN | 105818961 | A | * 8/2016 | ............ B64C 1/36 |
| CN | 105818961 | A | | 8/2016 |
| CN | 105836117 | A | | 8/2016 |
| CN | 205790344 | U | | 12/2016 |
| CN | 206218204 | U | | 6/2017 |
| CN | 206893798 | U | | 1/2018 |
| EP | 3162704 | A1 | | 5/2017 |

OTHER PUBLICATIONS

Supplementary European Search Report dated Feb. 20, 2019; EP18723352.

* cited by examiner

ANTENNA AND UNMANNED AERIAL VEHICLE

CROSS REFERENCE

The present application is a continuation of International Application NO. PCT/CN2018/083169, filed on Apr. 16, 2018, which claims priority to Chinese Patent Application NO.2017208307375, filed on Jul. 10, 2017, both of which are incorporated herein by reference in their entirety.

TECHNICAL FIELD

The present invention relates to the field of unmanned aerial vehicle technologies, and in particular, to an antenna and an unmanned aerial vehicle using the antenna.

RELATED ART

An unmanned aerial vehicle (Unmanned Aerial Vehicle, UAV) is an unmanned aircraft that controls flight attitudes by using a radio remote control device and a built-in program. Because of the advantages of flexible maneuver, quick response, unmanned piloting and low operation requirements, UAV is widely applied to multiple fields such as aerial photography, plant protection, power inspection, and disaster rescue. In an unmanned aerial vehicle, radio communications between the unmanned aerial vehicle and other devices are implemented by using an antenna. Therefore, the antenna is an indispensable and important component of the unmanned aerial vehicle.

Currently, antennas on the market mainly work at the frequencies of 2.4 G and 5.8 G, and a vertical clearance of at least 30-60 millimeters for the antennas must be ensured on the unmanned aerial vehicle. The antennas are generally mounted below a motor or disposed in a landing gear below the motor, so that the antennas are ensured to be far away from a vehicle body, to prevent an antenna signal from being blocked. The landing gear cannot be folded relative to the vehicle body, and cannot meet requirements of miniaturization and portability of the unmanned aerial vehicle. In addition, when the unmanned aerial vehicle is applied to the fields of aerial photography, film and television photography or the like that need to acquire images by the camera apparatus, a user has relatively high requirement on a vision of the camera apparatus of the unmanned aerial vehicle, and one of the important requirements is to prevent any vehicle body component from blocking the vision of the camera apparatus. Because the mounting manner of the antenna is special, the antenna usually and easily becomes a vehicle body component blocking the vision of the camera apparatus. Moreover, because a low frequency antenna of 900M and the like have relatively good gain-receiving and anti-interference capabilities, the low frequency antenna of 900M and the like are gradually applied to the unmanned aerial vehicle. However, a length of this type of antenna needs to reach at least 160 mm or the above, and if the type of antenna is applied to the unmanned aerial vehicle that needs to acquire images, the type of antenna excessively blocks the vision of the camera apparatus to affect the shooting effect.

SUMMARY

Embodiments of the present invention provide a miniaturized and portable unmanned aerial vehicle having a camera apparatus whose shooting vision is not blocked by components thereof.

A technical solution adopted in the present invention is to provide an antenna, which applied to an unmanned aerial vehicle, the unmanned aerial vehicle including a camera apparatus, where the antenna includes an antenna body and a bending part connected to the antenna body; and the bending part bends to a direction avoiding a field of view of the camera apparatus.

In an embodiment of the present invention, the antenna body and the bending part are in a fixed connection.

In an embodiment of the present invention, the antenna body is hingedly connected to the bending part.

In an embodiment of the present invention, the antenna is further provided with a limiting structure.

In an embodiment of the present invention, the antenna body has a first bevel, the bending part having a second bevel, the second bevel abuts against the first bevel in a state the bending part bending to the antenna body.

In an embodiment of the present invention, the antenna body extends to a direction perpendicular to the ground.

In an embodiment of the present invention, the field of view of the camera apparatus is FOV, and an angle formed by the antenna body and the bending part is: 90°+FOV/2 or 90°−FOV/2.

In an embodiment of the present invention, the angle formed by the antenna body and the bending part is: 90°+FOV/2.

Another technical solution adopted in the present invention is to construct a type of unmanned aerial vehicle, which includes:

a vehicle body;
an arm, connected to the vehicle body;
a power apparatus, disposed on the arm;
a camera apparatus, mounted below the vehicle body; and
a component having a built-in antenna, where the component is mounted on the arm and capable of rotating relative to the power apparatus.

In an embodiment of the present invention, the component is a landing gear.

In an embodiment of the present invention, the component is located below the power apparatus.

In an embodiment of the present invention, the component is located at the end of the arm.

In an embodiment of the present invention, the arm is rotatably connected to the vehicle body.

Beneficial effects of the embodiments of the present invention are: an antenna according to the present invention includes an antenna body and a bending part connected to the antenna body, where the bending part bends to a direction avoiding a field of view of the camera apparatus. It can be ensured that the antenna has a certain effective length to obtain a relatively strong radio signal, and avoids a shooting vision of the camera apparatus at the same time, so that images satisfying user's demands are obtained. In addition, a component having a built-in antenna is mounted on an arm and capable of rotating relative to the power apparatus, that is, may be folded relative to the vehicle body, and can meet requirements of miniaturization and portability of the unmanned aerial vehicle.

BRIEF DESCRIPTION OF THE DRAWINGS

To describe technical solutions in embodiments of the present invention more clearly, the following briefly introduce drawings required for describing the embodiments of the present invention. Apparently, the accompanying drawings in the following description show some embodiments of the present invention, and a person of ordinary skill in the FIG. 1 is a front view of an unmanned aerial vehicle according to an embodiment of the present invention.

DETAILED DESCRIPTION

For ease of understanding the present invention, the present invention is described in further detail below with reference to accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Positions or position relationships indicated by terms such as "above", "below", "inside", "outside", "bottom" are positions or position relationships based on the accompanying drawings, and are merely for ease of description of the present invention and for simplifying description, but not for indicating or implying that the described apparatus or element should have a particular position, or should be constructed or operated at the particular position. Therefore, the positions or position relationships should not be understood as limitations to the present invention. In addition, the terms such as "first" and "second" are merely used to describe objectives, and should not be understood as indication or implication of relative importance.

Unless otherwise defined, meanings of all technical and scientific terms used in this specification are the same as those usually understood by a person skilled in the technical field to which the present invention belongs. The terms used in the specification of the present invention are merely intended to describe specific embodiments rather than limit the present invention. The term "and/or" used in this specification includes any or all combinations of one or more related listed items. In addition, technical features involved in different embodiments of the present invention that are described below can be combined with each other provided that there is no conflict.

Figure 1:
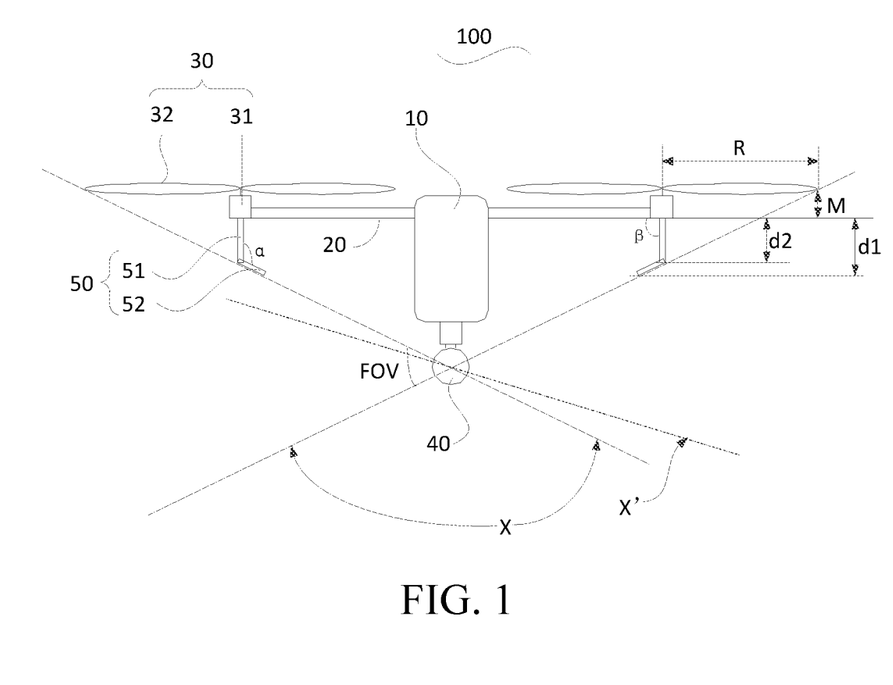

FIG. 1 is a front view of an unmanned aerial vehicle according to an embodiment of the present invention. Referring to FIG. 1, the unmanned aerial vehicle 100 includes a vehicle body 10, an arm 20 connected to the vehicle body 10, power apparatuses 30 separately disposed on the arms 20, a camera apparatus 40 mounted below the vehicle body 10 and an antenna 50 mounted below the power apparatus 30. In this embodiment, a radio communications connection between the unmanned aerial vehicle 100 and an external device is implemented by the antenna 50. The power apparatus 30 provides power for the unmanned aerial vehicle 100, to drive the unmanned aerial vehicle 100 to fly and adjust flight attitudes. Image information of shooting scenarios is acquired by the camera apparatus 40.

A control circuit assembly consisting of electronic parts and components such as an MCU is provided in the vehicle body 10. The control circuit assembly may include multiple control modules, for example, a flight control module for controlling the power apparatus 30 to adjust a flight attitude of the unmanned aerial vehicle, a BeiDou module or a GPS module for navigating the unmanned aerial vehicle and a data processing module for processing environment information acquired by related onboard devices (such as the camera apparatus 40).

Shapes and the number of the arm 20 are both not limited, and the number may be two, four, and six. In an embodiment of the present invention, the aim 20 may be rotatably connected or may be connected in a fixed manner to the vehicle body 10. When being rotatably connected to the vehicle body 10, the arm 20 may be folded or unfolded relative to the vehicle body 10, to improve portability of the unmanned aerial vehicle 100.

The power apparatus 30 includes a drive apparatus 31 mounted on the arm 20 and a propeller 32 mounted on the drive apparatus 31. When being operated, the drive apparatus 31 drives the propeller 32 to rotate along a particular direction (a clockwise direction or a counterclockwise direction), to provide lift force for the unmanned aerial vehicle 100 and drive the unmanned aerial vehicle 100 to fly. In addition, the unmanned aerial vehicle 100 may further implement flights of different attitudes by adjusting a rotational speed or a relative position of the apparatus 31 separately.

The camera apparatus 40 may include any camera mechanism that can acquire an image of a current shooting scenario, such as a camera. The camera mechanism may be a unidirectional camera mechanism, or may be a panoramic camera mechanism. The panoramic camera mechanism may be a single panoramic camera, or may be a panoramic camera mechanism consisted of unidirectional cameras carried on a gimbal that can rotate 360°.

In an embodiment of the present invention, the antenna 50 is disposed far away from the position of the vehicle body 10 to prevent components in the vehicle body 10 from causing interferences to the antenna 50. In this embodiment, the antenna 50 is mounted on the arm 20 and is located below the power apparatus 30. It should be noted that, the antenna 50 is usually not exposed out, to prevent the antenna 50 from being affected by an environment and being damaged. Therefore, the antenna may be accommodated in a particular component. For consideration of fully using space, generally, the antenna may be arranged in a landing gear.

Particularly, in an embodiment of the present invention, the antenna 50 is an unmanned aerial vehicle antenna having a bend structure. The antenna 50 has a certain effective length to obtain a relatively strong radio signal, and can skillfully avoid a shooting vision of the camera apparatus 40 when the camera apparatus 40 works.

Specifically, referring to FIGS. 1-4, the antenna 50 includes an antenna body 51 and a bending part 52 connected to the antenna body 51. The antenna body 51 is mounted on the arm 20, and the bending part 52 bends to a direction avoiding a field of view of the camera apparatus 40. The antenna body 51 includes a first connection end 511 and a second connection end 512, and the bending part 52 includes a third connection end 521 and a suspended end 522. The first connection end 511 of the antenna body 51 is mounted on the arm 20 and below the drive apparatus 31, and the second connection end 512 of the antenna body 51 is far away from the drive apparatus 31 and is connected to the third connection end 521 of the bending part 52.

Figure 2:
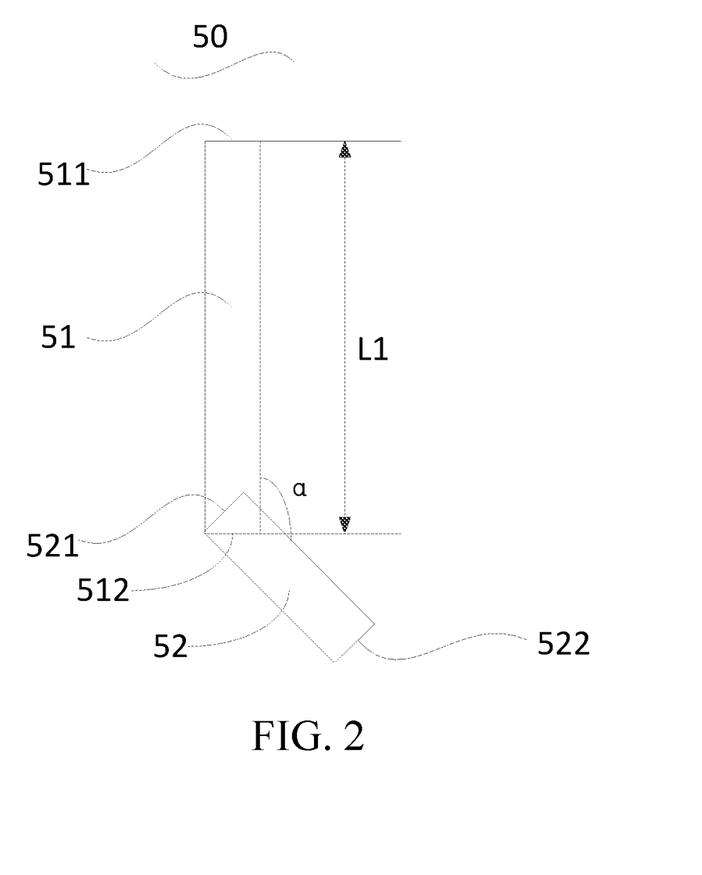
FIG. 2 is a schematic structural diagram of one of structures of the antenna shown in FIG. 1.

In this embodiment, the antenna body 51 is the main part of the antenna 50, and the antenna body 51 may be a single antenna (that is, a bare wire), or may be a component (such as a landing gear) having a built-in antenna. Shapes of the antenna body 51 may include but is not limited to a rod shape, a spiral shape, a wave shape, and the like. The cross section thereof may include but is not limited to a round shape, a triangle shape, a square shape, another irregular shape, and the like. This is not limited in the embodiments of the present invention.

Generally, during a flight process of the unmanned aerial vehicle, to ensure a stable radio communication between the unmanned aerial vehicle 100 and an external device on the ground being implemented, an angle β between the antenna body 51 and the drive apparatus 31, that is, an angle β between the antenna body 51 and the arm 20 needs to satisfy: 45°<β≤90°. Preferably, to enhance intensity of a radio signal received or transmitted by the antenna 50, the antenna body 51 extends to a direction perpendicular to the ground, and the first connection end 511 of the antenna body 51 is perpendicularly mounted below the drive apparatus 31 (that is: β=90°. A manner for connecting the first connection end 511 of the antenna body 51 and the arm 20 may be a manner of a fixed connection, such as a clamping connection, or a forked connection. The connection manner is relatively simple, and is applicable to an unmanned aerial vehicle carrying a camera apparatus having a particular field of view.

In some embodiments, a manner for connecting the first connection end 511 of the antenna body 51 and the arm 20 may be a manner of a rotatable connection (for example, a hinged connection). Under the action of an external force, the antenna body 51 may deflect around the drive apparatus 31, thereby correspondingly adjusting the angle β between the antenna body 51 and the drive apparatus 31 according to fields of view of different camera mechanism. However, when the unmanned aerial vehicle does not work, the antenna body 51 may rotate relative to the drive apparatus 31. Therefore, the antenna body 51 can rotate to a position parallel to the arm 20, that is, in this case, an angle between the antenna body 51 and the arm 20 is 0° or 180°, so that occupation space of the unmanned aerial vehicle is further narrowed.

Figure 3:
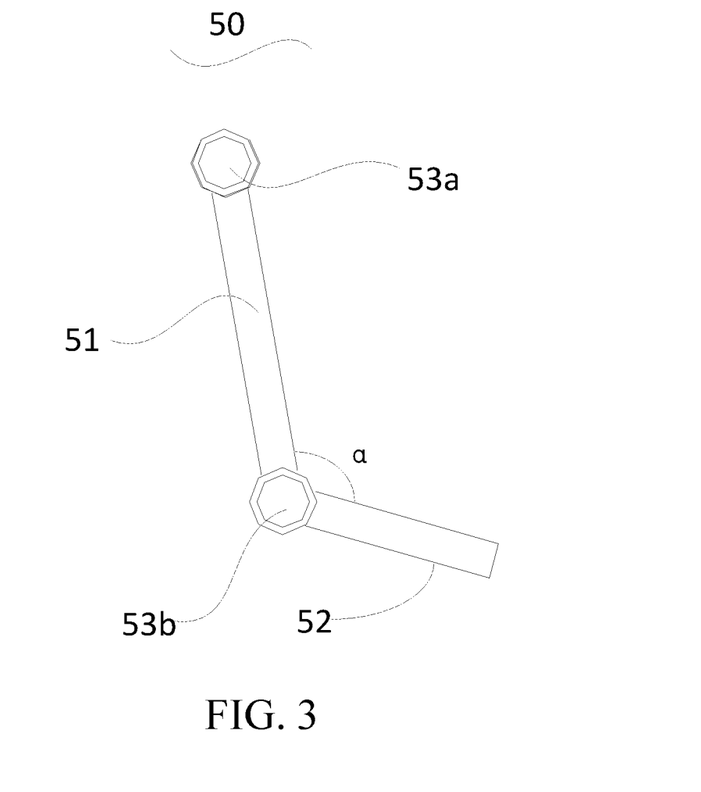
FIG. 3 is a schematic structural diagram of another structure of the antenna shown in FIG. 1.

Further, in other embodiments, as shown in FIG. 3, to improve a connection stability between the first connection end 511 of the antenna body 51 and the arm 20, and prevent the angle β between the antenna body 51 and the arm 20 during a flight process of the unmanned aerial vehicle 100 from changing so as to affect shooting, a first limiting structure 53a may further be disposed on the junction of the first connection end 511 of the antenna body 51 and the arm 20. The first limiting structure 53a may be a component limiting the angle β as a preset angle, such as a spring lock. Alternatively, the first limiting structure 53a may be a control apparatus that can timely adjust the angle β. The control apparatus includes a drive unit, which may timely adjust the angle β between the antenna body 51 and the arm 20 according to an actual situation when the camera apparatus 40 works, to prevent the antenna 50 from blocking a shooting vision of the camera apparatus 40 when the unmanned aerial vehicle 100 flies by using other flight attitudes.

In this embodiment, the bending part 52 is the bending part of the antenna 50. A length of the bending part 52 is less than or equals to a length of the antenna body 51, and bends to a direction avoiding a field of view of the camera apparatus 40. When the antenna body 51 extends to a direction perpendicular to the ground, an angle (that is, an angle α between the antenna body 51 and the bending part 52) between the antenna body 51 and the bending part 52 may be set to 90°+FOV/2 or 90°−FOV/2, where the FOV is the field of view of the camera apparatus 40. When the angle between the antenna body 51 and the bending part 52 is: 90°+FOV/2, a distance d1 between the suspended end 522 of the bending part 52 and the bottom of the aim 20 is greater than a distance d2 between the third connection end 521 of the bending part 52 and the bottom of the arm 20, so that it can be ensured that the antenna 50 may transmit a radio signal to the ground and/or receive a radio signal transmitted from the ground to the unmanned aerial vehicle 100 better.

The third connection end 521 of the bending part 52 is connected to the second connection end 512 of the antenna body 51, and a connection manner therebetween may be a manner of a fixed connection, such as a clamping connection, a forked connection, and an integrated connection. In another embodiment, the third connection end 521 may be hingedly connected to the second connection end 512 of the antenna body 51. Under an action of an external force, the bending part 52 may rotate around the antenna body 51, so that an angle α between the antenna body 51 and the bending part 52 can be adjusted according to fields of view of different camera apparatuses 40.

Figure 4:
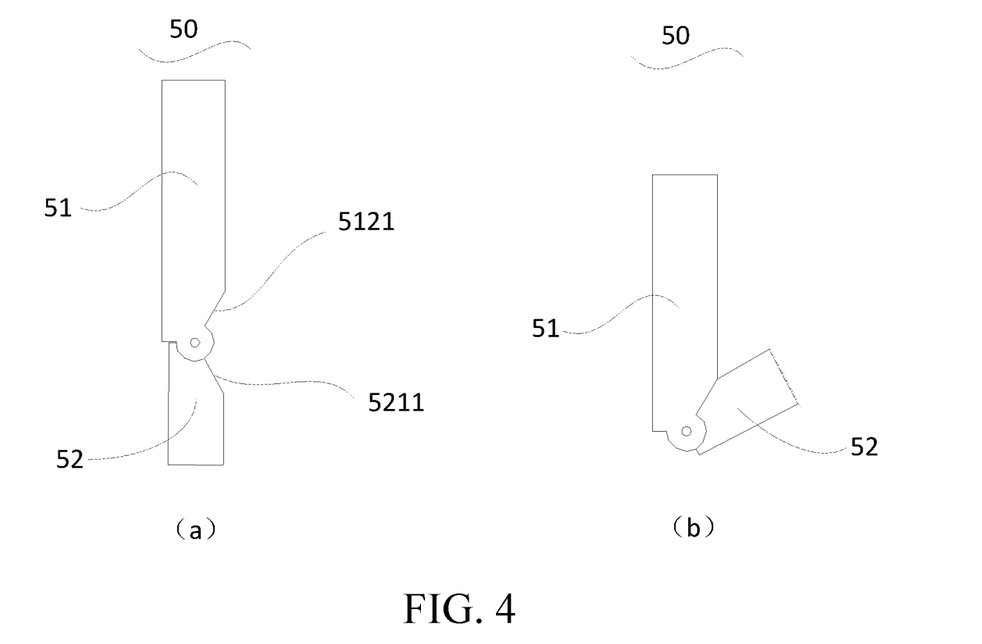
FIG. 4 is a schematic structural diagram of still another structure of the antenna shown in FIG. 1.

Further, in other embodiments, to improve a connection stability between the antenna body 51 and the bending part 52, and prevent an angle α between the antenna body 51 and the bending part 52 from changing so as to affect shooting during a flight process of the unmanned aerial vehicle 100, a second limiting structure 53b may further be disposed on the junction of the bending part 52 and the antenna body 51. The second limiting structure 53b may be a component limiting the angle α as a preset angle, such as a spring lock. Alternatively, the second limiting structure 53b may be a control apparatus that can timely adjust an angle of the angle α. The control apparatus includes a drive unit, which may timely adjust the angle α between the antenna body 51 and the bending part 52 according to an actual situation. In other possible embodiments, shapes of the antenna body 51 or the bending part 52 may be changed, to form a limiting structure in the antenna 50. For example, as shown in FIG. 4(a), the antenna body 51 has a first bevel 5121 and the bending part 52 has a second bevel 5211. When the bending part 52 bends to the antenna body 51, as shown in FIG. 4(b), the second bevel 5211 abuts against the first bevel 5121, so that an angle formed by the bending part 52 and the antenna body 51 is limited by an angle formed between a direction in which the first bevel 5121 extends and a direction in which the antenna body 51 extends.

When the antenna 50 includes the first limiting structure 53a and the second limiting structure 53b at the same time, and the first limiting structure 53a and the second limiting structure 53b are both control apparatuses, values of the angle α and the angle β may further be adjusted at the same time in a linkage manner, to improve flexibility of the antenna 50. For example, when the camera apparatus 40 works, the angle α may be adjusted by using the second limiting structure 53b and/or the angle β may be adjusted by using the first limiting structure 53a according to a flight status of the unmanned aerial vehicle 100, to prevent the antenna 50 from blocking a shooting vision of the camera apparatus 40 when the unmanned aerial vehicle 100 flies by using other flight attitudes. Or, when the unmanned aerial vehicle 100 still performs a flight task but the camera apparatus 40 stops working, the angle α may be adjusted by using the second limiting structure 53b and/or the angle β may be adjusted by using the first limiting structure 53a, to enable the bending part 52 and/or the antenna body 51 be perpendicular to the ground, so that a relatively strong radio signal can be obtained. Or, when the unmanned aerial vehicle 100 needs to be retracted, angle α=0° may be achieved by adjusting the limiting structure 53b, and a value of the angle β may be reduced by using the first limiting structure 53a, so that space occupied by the antenna 50 is narrowed.

In an actual application, an appropriate antenna 50 may be selected according to a mounting position of the camera apparatus 40 and the antenna 50, a total length required by the antenna 50 and a field of view of the camera apparatus 40 (that is, a length L1 of the antenna body 51 of the antenna 50 and an angle α between the antenna body 51 and the bending part 52 are determined).

For example, as shown in FIG. 1, the unmanned aerial vehicle 100 is currently in a horizontal flying or hovering status, and the antenna 50 is perpendicularly mounted below the drive apparatus 31 (that is, the angle β between the antenna body 51 and the arm 20 equals to 90°). It is assumed that the field of view of the camera apparatus 40 is FOV, a maximum shooting sight corresponding to the field of view FOV is X, a range covered by the maximum shooting sight X is a shooting vision of the camera apparatus 40; a length of a single blade of the propeller 32 is R, a length of the drive apparatus 31 in a vertical direction is M; and a total length required by the antenna 50 is $L_{tot}$. First, to ensure that the antenna body 51 of the antenna 50 avoids the shooting vision (that is, the second connection end 512 of the antenna body 51 is located outside the maximum shooting sight X of the camera apparatus 40) of the camera apparatus 40, the length L1 of the antenna body 51 of the antenna 50 needs to satisfy: L1≤R*tan(FOV/2)−M; secondarily, to ensure that the bending part 52 avoids the shooting vision of the camera apparatus 40 (that is, the third connection end 521 of the bending part 52 and the suspended end 522 are both located outside the maximum shooting sight X of the camera apparatus 40), the angle α between the antenna body 51 and the bending part 52 needs to satisfy: 180°−β<α≤180°−β+FOV/2. In addition, if L1=R*tan(FOV/2)−M<Ltot/2 (indicating that a length of the antenna body 51 is less than a length of the bending part 52 in this case), the angle β between the antenna body 51 and the arm 20, the length L1 of the antenna body 51 and the angle α between the antenna body 51 and the bending part 52 need to be adjusted or a model of the antenna 50 needs to be replaced, to ensure when the length of the antenna body 51 is greater than or equals to the length of the bending part 52, a distance d1 between the suspended end 522 of the bending part 52 and the bottom of the arm 20 is greater than a distance d2 between the third connection end 521 of the bending part 52 and the bottom of the arm 20, and the third connection end 521 and the suspended end 522 of the bending part 52 are both located outside the maximum shooting sight X of the camera apparatus 40 (that is, the antenna 50 avoids the shooting vision of the camera apparatus 40).

It should be understood that, in this embodiment, only an example in which the maximum shooting sight X of the camera apparatus 40 is a connection of the camera apparatus 40 and the propeller 32 is described. This is not intended to limit the present invention. In other embodiments, the maximum shooting sight X of the camera apparatus 40 may further be X' shown in FIG. 1 or other sights.

In conclusion, distinguished from cases in the prior art, the antenna according to the embodiments of the present invention includes an antenna body and a bending part connected to the antenna body, where the bending part bends to a direction avoiding a field of view of the camera apparatus. It can be ensured that the antenna has a certain effective length to obtain a relatively strong radio signal, and avoids a shooting vision of the camera apparatus at the same time, so that images satisfying user demands are obtained.

It should be noted that, the specification of the present invention and the accompanying drawings thereof give out preferable embodiments of the present invention. However, the present invention may be implemented by multiple different forms, and is not limited to the embodiments described in this specification. These embodiments are not extra limitation to content of the present invention, an objective of providing these embodiments is to enable the content disclosed in the present invention be thoroughly and fully understood. Moreover, various embodiments that are not listed above and that are formed by still combining the technical features, all fall within the scope recorded in the specification of the present invention. Further, for a person of ordinary skill in the art, changes or transformations may be made according to the description, and all the changes and transformations all fall within the protection scope of claims belonging to the present invention.

What is claimed is:

1. An unmanned aerial vehicle, comprising:
   a vehicle body;
   an arm rotatably connected to the vehicle body, wherein the arm is folded or unfolded relative to the vehicle body;
   a power apparatus disposed on an end of the arm, wherein the end of the arm is an end far away from the vehicle body, wherein the power apparatus comprises a drive apparatus mounted on the arm and a propeller mounted on the drive apparatus;
   a camera apparatus mounted on the vehicle body, wherein the camera apparatus is configured to capture an image; and
   a landing gear having a built-in antenna, wherein the landing gear is mounted below the power apparatus;
   wherein the landing gear is configured to rotate relative to the power apparatus so that an angle between the landing gear and the arm is adjustable.

2. The unmanned aerial vehicle according to claim 1, wherein the antenna comprises an antenna body and a bending part, the bending part being connected to the antenna body, the bending part bending to a direction of avoiding a field of view of the camera apparatus.

3. The unmanned aerial vehicle according to claim 2, wherein the antenna body is fixed with the bending part.

4. The unmanned aerial vehicle according to claim 2, wherein the antenna body is hingedly connected to the bending part.

5. The unmanned aerial vehicle according to claim 2, wherein the antenna is further provided with a limiting structure.

6. The unmanned aerial vehicle according to claim 5, wherein the antenna body has a first bevel, the bending part having a second bevel, wherein the second bevel abuts against the first bevel in a state where the bending part bends to the antenna body.

7. The unmanned aerial vehicle according to claim 2, wherein the antenna body extends to a direction perpendicular to the ground.

8. The unmanned aerial vehicle according to claim 7, wherein an angle formed by the antenna body and the bending part is: 90°+FOV/2 or 90°−FOV/2;
   wherein the FOV is the field of view of the camera apparatus.

9. The unmanned aerial vehicle according to claim 8, wherein the angle formed by the antenna body and the bending part is: 90°+FOV/2.

10. The unmanned aerial vehicle according to claim 1, wherein the landing gear is a rod shape.

11. The unmanned aerial vehicle according to claim 1, wherein during flight of the unmanned aerial vehicle, the angle between the landing gear and the arm is greater than 45°.

12. The unmanned aerial vehicle according to claim 1, wherein during flight of the unmanned aerial vehicle, the angle between the landing gear and the arm is not greater than 90°.

13. The unmanned aerial vehicle according to claim 1, wherein the landing gear is configured to rotate to a position where the landing gear is parallel to the arm.

14. The unmanned aerial vehicle according to claim 1, wherein the landing gear is configured to rotate to a position where an end of the landing gear far away from the power apparatus is adjacent to the arm.

15. The unmanned aerial vehicle according to claim 1, further comprising a limiting structure configured to set the angle between the landing gear and the arm to be a preset angle.

16. The unmanned aerial vehicle according to claim 1, further comprising a limiting structure configured to timely adjust the angle between the landing gear and the arm.

* * * * *